United States Patent
Tang et al.

(10) Patent No.: US 11,276,051 B2
(45) Date of Patent: Mar. 15, 2022

(54) SYSTEMS AND METHODS FOR CONVENIENT AND SECURE MOBILE TRANSACTIONS

(71) Applicant: Wayne Fueling Systems LLC, Austin, TX (US)

(72) Inventors: Weiming Tang, Austin, TX (US); James M. Brewer, Austin, TX (US)

(73) Assignee: Wayne Fueling Systems LLC, Austin, TX (US)

( * ) Notice: Subject to any disclaimer, the term of this patent is extended or adjusted under 35 U.S.C. 154(b) by 410 days.

(21) Appl. No.: 16/276,005

(22) Filed: Feb. 14, 2019

(65) Prior Publication Data

US 2019/0205858 A1 Jul. 4, 2019

Related U.S. Application Data

(63) Continuation of application No. 15/004,160, filed on Jan. 22, 2016, now Pat. No. 10,217,096, which is a
(Continued)

(51) Int. Cl.
*G06Q 20/20* (2012.01)
*H04L 29/06* (2006.01)
(Continued)

(52) U.S. Cl.
CPC ............ *G06Q 20/204* (2013.01); *G06Q 20/18* (2013.01); *G06Q 20/327* (2013.01);
(Continued)

(58) Field of Classification Search
CPC ............ G06Q 20/204; G06Q 20/3829; G06Q 20/327; G06Q 20/18; G06Q 30/06;
(Continued)

(56) References Cited

U.S. PATENT DOCUMENTS 7,073,073 B1 * 7/2006 Nonaka ............... H04L 9/3247
713/193
7,159,114 B1 * 1/2007 Zajkowski ......... G06Q 20/3552
713/171
(Continued)

FOREIGN PATENT DOCUMENTS

WO WO-2012/031549 A1 3/2012
WO WO-2012/151660 A1 11/2012
(Continued)

OTHER PUBLICATIONS

U.B. Ceipidor, C.M. Medaglia, A. Marino, S. Sposato and A. Moroni,"KerNeeS: A protocol for mutual authentication between NFC phones and POS terminals for secure payment transactions," 2012 9th International ISC Conference on Information Security and Cryptology, 2012, pp. 115-120, doi: 10.1109/ISCISC.2012. 6408203.*
(Continued)

*Primary Examiner* — David Garcia Cervetti
(74) *Attorney, Agent, or Firm* — Mintz, Levin, Cohn, Ferris, Glovsky and Popeo, P.C.

(57) ABSTRACT

Systems and methods for conducting convenient and secure mobile transactions between a payment terminal and a mobile device, e.g., in a fueling environment, are disclosed herein. In some embodiments, the payment terminal and the mobile device conduct a mutual authentication process that, if successful, produces a session key which can be used to encrypt sensitive data to be exchanged between the payment terminal and the mobile device. Payment and loyalty information can be securely communicated from the mobile device to the payment terminal using the session key. This can be done automatically, without waiting for the user to initiate a transaction, to shorten the overall transaction time. The transaction can also be completed without any user
(Continued)

interaction with the mobile device, increasing the user's convenience since the mobile device can be left in the user's pocket, purse, vehicle, etc.

20 Claims, 7 Drawing Sheets

Related U.S. Application Data continuation of application No. 14/083,948, filed on Nov. 19, 2013, now Pat. No. 9,276,910.

(51) Int. Cl.
*G06Q 20/40* (2012.01)
*G06Q 20/32* (2012.01)
*G06Q 30/06* (2012.01)
*G06Q 20/18* (2012.01)
*G07F 13/02* (2006.01)
*G06Q 20/38* (2012.01)

(52) U.S. Cl.
CPC ..... *G06Q 20/3278* (2013.01); *G06Q 20/3829* (2013.01); *G06Q 20/401* (2013.01); *G06Q 20/4097* (2013.01); *G06Q 30/06* (2013.01); *G07F 13/025* (2013.01); *H04L 63/0428* (2013.01); *G06Q 2220/00* (2013.01)

(58) Field of Classification Search
CPC ............ G06Q 20/3278; G06Q 20/401; G06Q 2220/00; G06Q 20/4097; G07F 13/025; H04L 63/0428
See application file for complete search history.

(56) References Cited

U.S. PATENT DOCUMENTS

| | | | |
|---|---|---|---|
| 7,349,871 B2* | 3/2008 | Labrou | G06Q 20/02 705/26.35 |
| 7,429,927 B2* | 9/2008 | Bonalle | G08B 13/2434 340/10.1 |
| 7,434,049 B2* | 10/2008 | Girard | G06Q 20/341 713/168 |
| 8,074,070 B2* | 12/2011 | Rebo | H04L 63/162 713/168 |
| 8,627,422 B2* | 1/2014 | Hawkes | H04W 12/06 726/5 |
| 8,627,442 B2 | 1/2014 | Ji et al. | |
| 8,872,619 B2* | 10/2014 | Berardi | G06Q 20/04 340/5.61 |
| 9,276,910 B2 | 3/2016 | Tang et al. | |
| 9,715,600 B2* | 7/2017 | Williams | G06F 21/52 |
| 9,715,682 B2* | 7/2017 | Webb | G07F 13/025 |
| 9,972,159 B2* | 5/2018 | Carapelli | G06Q 20/322 |
| 10,217,096 B2 | 2/2019 | Tang et al. | |
| 11,080,669 B1* | 8/2021 | Walker | G06Q 20/38215 |
| 2001/0020274 A1* | 9/2001 | Shambroom | G06F 21/41 726/10 |
| 2003/0120611 A1* | 6/2003 | Yoshino | G06F 21/10 705/67 |
| 2003/0121969 A1* | 7/2003 | Wankmueller | G06Q 20/341 235/379 |
| 2003/0149854 A1* | 8/2003 | Yoshino | G06F 21/6218 711/173 |
| 2003/0188117 A1* | 10/2003 | Yoshino | G06F 21/6218 711/164 |
| 2003/0191709 A1* | 10/2003 | Elston | G06Q 30/0225 705/40 |
| 2004/0168184 A1* | 8/2004 | Steenkamp | H04N 21/4405 725/31 |
| 2004/0182921 A1* | 9/2004 | Dickson | G07F 7/1025 235/380 |
| 2005/0089165 A1* | 4/2005 | Kitani | G11B 20/00086 380/201 |
| 2005/0089465 A1 | 4/2005 | Anumakonda et al. | |
| 2006/0012479 A1* | 1/2006 | Ezra | G06Q 20/327 340/572.1 |
| 2006/0075477 A1* | 4/2006 | Shenoy | G06F 21/335 726/7 |
| 2006/0116968 A1* | 6/2006 | Arisawa | G06Q 20/26 705/67 |
| 2006/0235796 A1* | 10/2006 | Johnson | G06Q 20/02 705/44 |
| 2007/0106559 A1* | 5/2007 | Harrell | G06Q 30/06 705/21 |
| 2007/0119859 A1* | 5/2007 | Harrell | G07F 9/026 222/52 |
| 2007/0136800 A1* | 6/2007 | Chan | H04L 63/0869 726/10 |
| 2007/0145127 A1* | 6/2007 | Ishibashi | G07C 9/27 235/382 |
| 2007/0168527 A1* | 7/2007 | Li | H04L 65/1009 709/228 |
| 2007/0265733 A1* | 11/2007 | Harrell | G07F 13/025 700/283 |
| 2008/0006685 A1* | 1/2008 | Rackley, III | G06Q 40/00 235/379 |
| 2008/0010190 A1* | 1/2008 | Rackley, III | G06Q 20/042 705/39 |
| 2008/0010191 A1* | 1/2008 | Rackley, III | G06Q 20/10 705/39 |
| 2008/0010192 A1* | 1/2008 | Rackley, III | G06Q 20/3223 705/39 |
| 2008/0010193 A1* | 1/2008 | Rackley, III | G06Q 20/3221 705/39 |
| 2008/0010196 A1* | 1/2008 | Rackley, III | G06Q 20/102 705/40 |
| 2008/0010204 A1* | 1/2008 | Rackley, III | G06Q 20/042 705/45 |
| 2008/0010215 A1* | 1/2008 | Rackley, III | G06Q 20/385 705/70 |
| 2008/0040287 A1* | 2/2008 | Harrell | G06Q 20/347 705/71 |
| 2008/0046984 A1* | 2/2008 | Bohmer | H04L 63/0853 726/5 |
| 2008/0091614 A1* | 4/2008 | Bas Bayod | G06Q 20/04 705/71 |
| 2008/0103984 A1* | 5/2008 | Choe | G06Q 20/3821 705/76 |
| 2008/0122595 A1* | 5/2008 | Yamamichi | B60R 25/2018 340/426.16 |
| 2008/0270796 A1* | 10/2008 | Suu | G11B 20/00086 713/169 |
| 2008/0305769 A1* | 12/2008 | Rubinstein | G06F 21/35 455/411 |
| 2009/0092060 A1* | 4/2009 | Goto | H04L 9/0869 370/254 |
| 2009/0119221 A1* | 5/2009 | Weston | G07F 7/1008 705/76 |
| 2009/0119756 A1* | 5/2009 | Acuna | G06Q 20/02 726/5 |
| 2009/0119757 A1* | 5/2009 | Acuna | G06Q 20/4014 726/5 |
| 2009/0144161 A1* | 6/2009 | Fisher | G06Q 20/202 705/16 |
| 2009/0144194 A1* | 6/2009 | Dickelman | G06Q 20/202 705/39 |
| 2009/0150672 A1* | 6/2009 | Kwon | H04L 9/0869 713/169 |
| 2009/0307491 A1* | 12/2009 | Nakatsugawa | G07F 7/1008 713/169 |
| 2010/0044433 A1* | 2/2010 | Wankmueller | G06Q 20/3558 235/381 |
| 2010/0161966 A1* | 6/2010 | Kwon | H04L 9/083 713/155 |
| 2011/0055554 A1* | 3/2011 | Xiao | H04W 12/06 713/155 |

(56) References Cited

U.S. PATENT DOCUMENTS

| | | | | |
|---|---|---|---|---|
| 2011/0191196 A1* | 8/2011 | Orr | G06Q 20/202 | 705/17 |
| 2011/0231319 A1* | 9/2011 | Bayod | G06Q 20/325 | 705/71 |
| 2011/0247063 A1* | 10/2011 | Aabye | G06Q 20/3829 | 726/6 |
| 2011/0276420 A1* | 11/2011 | White | G06Q 20/349 | 705/17 |
| 2011/0302627 A1* | 12/2011 | Blom | H04L 63/0492 | 726/2 |
| 2012/0084438 A1* | 4/2012 | Raleigh | H04W 12/106 | 709/224 |
| 2012/0197740 A1* | 8/2012 | Grigg | G06Q 20/20 | 705/16 |
| 2012/0284193 A1* | 11/2012 | Bharghavan | G06Q 20/202 | 705/64 |
| 2012/0290415 A1* | 11/2012 | Itwaru | G06Q 20/306 | 705/16 |
| 2013/0065564 A1* | 3/2013 | Conner | G06K 19/0718 | 455/414.1 |
| 2013/0124413 A1* | 5/2013 | Itwaru | G06Q 20/20 | 705/44 |
| 2013/0124421 A1* | 5/2013 | Deng | G06Q 20/3829 | 705/71 |
| 2013/0179353 A1 | 7/2013 | Ran et al. | | |
| 2013/0226791 A1* | 8/2013 | Springer | G06Q 40/12 | 705/41 |
| 2013/0226797 A1* | 8/2013 | Jiang | G06Q 20/3829 | 705/44 |
| 2013/0246171 A1* | 9/2013 | Carapelli | G06Q 20/326 | 705/14.51 |
| 2013/0262317 A1* | 10/2013 | Collinge | G06Q 20/3823 | 705/71 |
| 2013/0278622 A1* | 10/2013 | Sun | G06Q 20/3276 | 345/589 |
| 2013/0290696 A1* | 10/2013 | Broustis | H04L 9/08 | 713/150 |
| 2013/0311630 A1* | 11/2013 | Chastain | H04L 12/1407 | 709/223 |
| 2013/0311672 A1* | 11/2013 | Chastain | H04L 67/143 | 709/238 |
| 2014/0040146 A1* | 2/2014 | Fiske | G06Q 20/3825 | 705/67 |
| 2014/0040149 A1* | 2/2014 | Fiske | H04L 9/083 | 705/71 |
| 2014/0075567 A1* | 3/2014 | Raleigh | G06Q 30/0601 | 726/26 |
| 2014/0114857 A1* | 4/2014 | Griggs | G06Q 40/00 | 705/44 |
| 2014/0199967 A1* | 7/2014 | Varoglu | H04W 4/21 | 455/411 |
| 2014/0236842 A1* | 8/2014 | Salminen | G06Q 20/326 | 705/75 |
| 2014/0244495 A1* | 8/2014 | Davis | G06Q 20/326 | 705/41 |
| 2014/0244514 A1* | 8/2014 | Rodriguez | G06Q 20/3674 | 705/71 |
| 2014/0244723 A1* | 8/2014 | Gong | H04L 63/164 | 709/203 |
| 2014/0258109 A1* | 9/2014 | Jiang | G06Q 20/341 | 705/41 |
| 2014/0258110 A1* | 9/2014 | Davis | G06Q 30/0611 | 705/41 |
| 2014/0289794 A1* | 9/2014 | Raleigh | G06F 21/575 | 726/1 |
| 2014/0289833 A1* | 9/2014 | Briceno | H04W 12/06 | 726/7 |
| 2014/0316993 A1* | 10/2014 | Spitz | G06F 21/31 | 705/72 |
| 2014/0337234 A1* | 11/2014 | Tang | H04L 63/0869 | 705/71 |
| 2015/0019442 A1* | 1/2015 | Hird | H04L 63/062 | 705/71 |
| 2015/0052352 A1* | 2/2015 | Dolev | H04L 9/3215 | 713/156 |
| 2015/0143116 A1 | 5/2015 | Tang et al. | | |
| 2017/0099604 A1* | 4/2017 | Raleigh | H04L 41/046 | |

FOREIGN PATENT DOCUMENTS

| | | |
|---|---|---|
| WO | WO-2012/151684 A1 | 11/2012 |
| WO | WO-2013/040169 A1 | 3/2013 |

OTHER PUBLICATIONS

Examination Report for European App. No. 14809563.1 dated Feb. 22, 2018 (6 pages).

* cited by examiner

US 11,276,051 B2

SYSTEMS AND METHODS FOR CONVENIENT AND SECURE MOBILE TRANSACTIONS

CROSS REFERENCE TO RELATED APPLICATION

The present application is a continuation of U.S. patent application Ser. No. 15/004,160, filed Jan. 22, 2016, and entitled "Systems and Methods for Convenient and Secure Mobile Transactions," now U.S. Pat. No. 10,217,096, which is a continuation of U.S. patent application Ser. No. 14/083,948, filed Nov. 19, 2013, and entitled "Systems and Methods for Convenient and Secure Mobile Transactions," now U.S. Pat. No. 9,276,910, which are hereby incorporated herein by reference in their entireties.

FIELD

The subject matter disclosed herein generally relates to systems and methods for convenient and secure mobile transactions, and more particularly to convenient and secure mobile payment in a fuel dispensing environment.

BACKGROUND

A number of mobile payment systems have been developed in which a mobile device can be used to pay for goods or services at a payment terminal. In some systems, the mobile device does not communicate directly with the payment terminal. Rather, the transaction is conducted between a mobile device payment infrastructure and a merchant payment infrastructure (e.g., cloud-to-cloud). Integrating these complex and widely-divergent infrastructures, however, can often be cost-prohibitive.

Other systems involve direct communication between the mobile device and the payment terminal. In such systems, sensitive user data such as payment and loyalty information is transmitted as cleartext, raising a number of security issues. For example, the sensitive user data can be intercepted by unscrupulous third parties. This can be of particular concern in fueling environments, where the payment terminal is often disposed in an unmanned, outdoor setting where there is an elevated risk of snooping or tampering. Users can be discouraged from using such systems for fear that the payment terminal may have been compromised.

Many existing mobile payment systems also require user interaction with the mobile device before, during, or after a transaction. For example, the user must retrieve the mobile device and launch a digital wallet application or otherwise interact with software executed on the mobile device to begin a transaction. The user must also hold the mobile device up to the payment terminal to place the mobile device in close proximity to the payment terminal.

Existing mobile payment systems can thus be unsecure and cumbersome or time consuming for the user, and a need exists for improved mobile payment systems.

BRIEF DESCRIPTION

Systems and methods for conducting convenient and secure mobile transactions between a payment terminal and a mobile device, e.g., in a fueling environment, are disclosed herein. In some embodiments, the payment terminal and the mobile device conduct a mutual authentication process that, if successful, produces a session key which can be used to encrypt sensitive data to be exchanged between the payment terminal and the mobile device. Payment and loyalty information can be securely communicated from the mobile device to the payment terminal using the session key. This can be done automatically, without waiting for the user to initiate a transaction, to shorten the overall transaction time. The transaction can also be completed without any user interaction with the mobile device, increasing the user's convenience since the mobile device can be left in the user's pocket, purse, vehicle, etc. The sensitive data can be deleted from the payment terminal automatically after a transaction is complete or if a transaction is never initiated.

In some embodiments, a terminal includes a wireless transceiver configured to communicate wirelessly with a mobile device, an input device configured to receive input from a user of the terminal, a storage device configured to store user information associated with one or more users, and at least one processor coupled to the wireless transceiver, the input device, and the storage device. The processor is programmed to conduct a mutual authentication process with a mobile device to obtain a session key, receive user information from the mobile device via the wireless transceiver, said user information being encrypted by the session key, store the user information in the storage device, receive a request to initiate a transaction from a user via the input device, prompt the user for authorization information, receive authorization information from the user via the input device, encrypt the authorization information using the session key, send the encrypted authorization information to the mobile device via the wireless transceiver, receive a validation result from the mobile device via the wireless transceiver, and when the validation result is positive, complete a transaction requested by the user using the stored user information.

In some embodiments, a mobile device includes a wireless transceiver configured to communicate wirelessly with a terminal, a storage device configured to store user information associated with a user, and at least one processor coupled to the wireless transceiver and the storage device. The processor is programmed to execute a transaction with a terminal by: conducting a mutual authentication process with the terminal to obtain a session key, encrypting the user information stored in the storage device using the session key, sending the encrypted user information to the terminal via the wireless transceiver, receiving encrypted authorization information from the terminal via the wireless transceiver, decrypting the authorization information using the session key, comparing the authorization information to master authorization information to generate a validation result, the validation result being positive when a match is found and being negative when a match is not found, and sending the validation result to the terminal via the wireless transceiver to facilitate completion of the transaction by the terminal.

In some embodiments, a method for conducting a convenient and secure mobile transaction using a terminal and a mobile device includes, automatically and without user interaction with the terminal or the mobile device, conducting a mutual authentication process in which the terminal and the mobile device authenticate one another to each obtain a session key, receiving user information from the mobile device via a wireless transceiver of the terminal, said user information being encrypted by the session key, and storing the user information in a storage device of the terminal. The method also includes receiving a request to initiate a transaction from a user via an input device of the terminal, prompting the user for authorization information via an electronic display of the terminal, receiving authorization information from the user via the input device, encrypting the authorization information using the session key, sending the encrypted authorization information to the mobile device via the wireless transceiver, receiving a validation result from the mobile device via the wireless transceiver, and when the validation result is positive, completing a transaction requested by the user using the stored user information.

BRIEF DESCRIPTION OF THE DRAWINGS

These and other features will be more readily understood from the following detailed description taken in conjunction with the accompanying drawings, in which.

Figure 1:
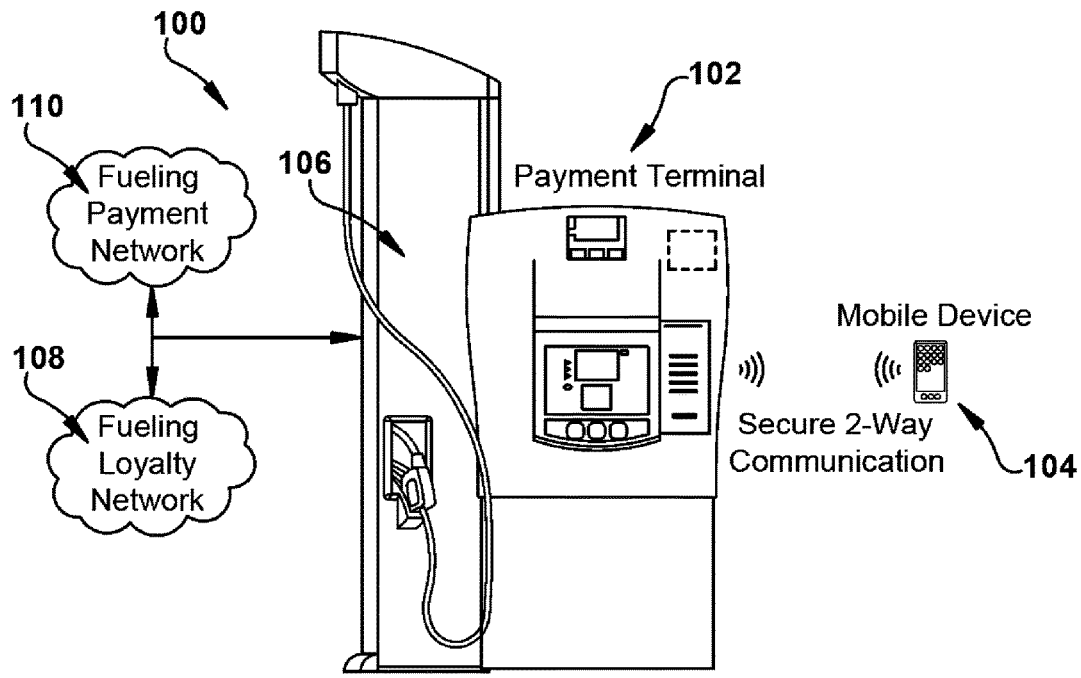
FIG. 1 is a schematic diagram of one exemplary embodiment of a fueling environment.

It is noted that the drawings are not necessarily to scale. The drawings are intended to depict only typical aspects of the subject matter disclosed herein, and therefore should not be considered as limiting the scope of the disclosure. In the drawings, like numbering represents like elements between the drawings.

DETAILED DESCRIPTION

Certain exemplary embodiments will now be described to provide an overall understanding of the principles of the structure, function, manufacture, and use of the devices, systems, and methods disclosed herein.

Systems and methods for conducting convenient and secure mobile transactions between a payment terminal and a mobile device, e.g., in a fueling environment, are disclosed herein. In some embodiments, the payment terminal and the mobile device conduct a mutual authentication process that, if successful, produces a session key which can be used to encrypt sensitive data to be exchanged between the payment terminal and the mobile device. Payment and loyalty information can be securely communicated from the mobile device to the payment terminal using the session key. This can be done automatically, without waiting for the user to initiate a transaction, to shorten the overall transaction time. The transaction can also be completed without any user interaction with the mobile device, increasing the user's convenience since the mobile device can be left in the user's pocket, purse, vehicle, etc. The sensitive data can be deleted from the payment terminal automatically after a transaction is complete or if a transaction is never initiated.

Fueling Environment

FIG. 1 illustrates an exemplary embodiment of a fueling environment 100 in which one or more of the systems and methods disclosed herein can be implemented. The fueling environment 100 generally includes a payment terminal 102 and a mobile device 104 associated with a user (e.g., a customer seeking to make a purchase using the payment terminal).

The payment terminal 102 can be integrated with a fuel dispenser 106, which can include various features well understood by those skilled in the art such as a nozzle, a pump, buttons for selecting fuel grade, an electronic display screen, and so forth. The payment terminal 102 can be or can include a computer system, as described below. The payment terminal 102 can be configured to communicate with various networks (e.g., directly or through a back end server), such as a fueling loyalty network 108 for maintaining, checking, and updating customer loyalty information and a fueling payment network 110 for processing fuel purchase and other transactions.

The mobile device 104 can be or can include a computer system, as described below. The mobile device 104 can be or can include any device that is configured to exchange data over a communications network, such as a mobile phone, tablet computer, laptop computer, digital wallet, and so forth. The mobile device 104 can be a handheld device that can be held by a user or stored in a user's pocket, purse, vehicle, etc. The mobile device 104 can also be integrated with a movable object such as a car, truck, motorcycle, or other vehicle.

Although a fueling environment 100 is shown in FIG. 1, it will be appreciated that the systems and methods disclosed herein can be readily applied in other settings, e.g., any setting in which a mobile device is used to conduct a transaction with a terminal. Transactions can include payment transactions, refund transactions, service transactions, control transactions, or any other transaction that requires communication. Terminals can include payment terminals, kiosks, and so forth, and/or can be part of a dispenser (e.g., a fuel dispenser, a snack or beverage dispenser, a cash dispenser, etc.).

Convenient and Secure Mobile Payment

Figure 2:
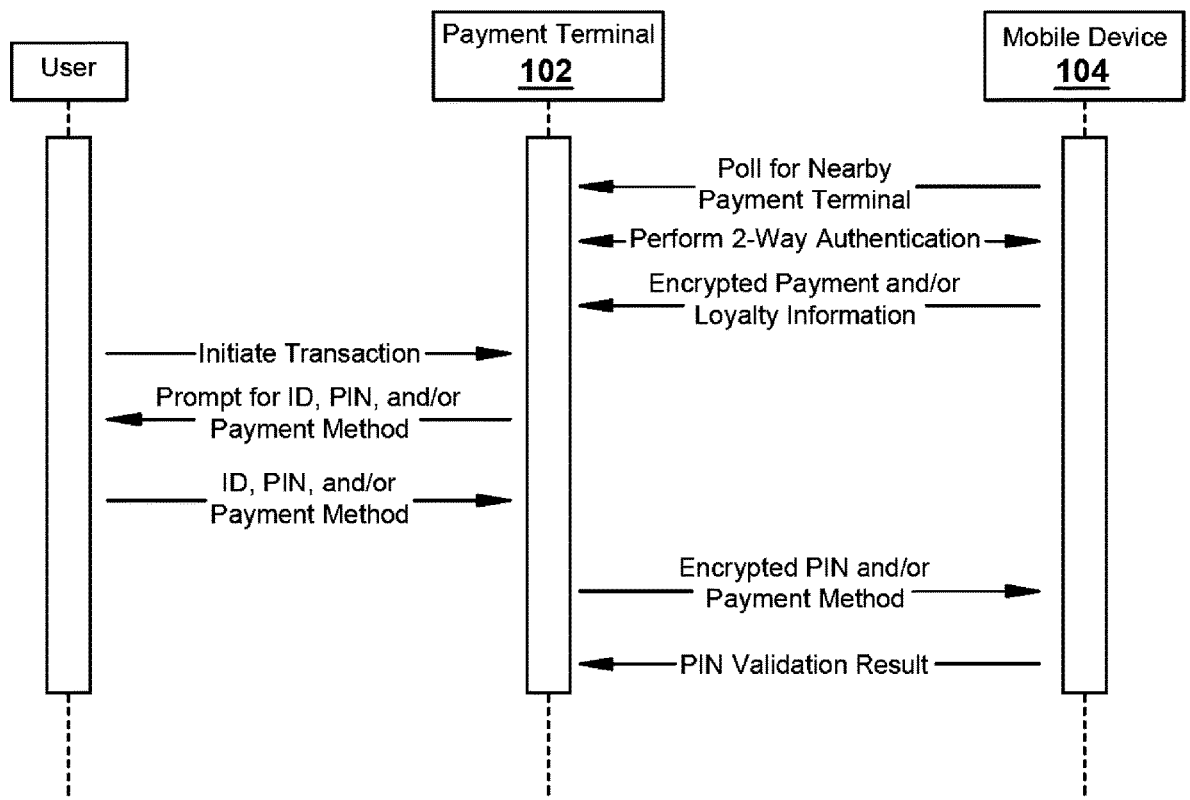
FIG. 2 is a sequence diagram of one exemplary embodiment of a method for conducting a secure and convenient transaction between a payment terminal, a mobile device, and a user.

FIG. 2 illustrates an exemplary embodiment of a convenient and secure mobile payment method by which a user can complete a purchase transaction using the payment terminal 102 and the mobile device 104. Prior to execution of the illustrated method, the user can enable mobile payment features of the mobile device 104, for example by installing an application in the mobile device or loading payment or loyalty account information into the mobile device. Enabling the mobile device 104 for mobile payment can be a one-time process, such that user interaction with the mobile device is not required before, during, or after transactions completed after the mobile device is initially enabled.

The illustrated method can begin with the mobile device and the payment terminal establishing a secure communications link therebetween. The mobile device can use polling or interrupt-based techniques to determine when a payment terminal is nearby and, when a payment terminal is detected, can initiate a two-way authentication process with the payment terminal. Alternatively, or in addition, the payment terminal can use polling or interrupt-based techniques to determine when a mobile device is nearby and, when a mobile device is detected, can initiate a two-way authentication process with the mobile device. In some embodiments, the mobile device periodically (e.g., every 30 seconds) emits a polling signal which is received by any payment terminals that are within range and which is used by such payment terminals to initiate the two-way authentication process.

If the mobile device is able to authenticate the payment terminal and the payment terminal is able to authenticate the mobile device, the two-way authentication process completes successfully with the mobile device and the payment terminal each possessing a session key (or respective portions of a session key pair), which can be used to encrypt and decrypt information to be communicated securely between the mobile device and the payment terminal. The term "session key" can be used interchangeably to refer to a single key and to refer to one or both portions of a session key pair. If the authentication process completes successfully, the mobile device encrypts customer information associated with the user or customer (e.g., account or other payment information, loyalty information, and so forth) using the session key. The encrypted customer information can be decrypted by the payment terminal using the session key and stored in a secure location within the payment terminal while the payment terminal waits for the user to initiate a transaction. The user's payment and loyalty data can thus be pre-loaded into the payment terminal, before the user initiates a transaction (e.g., before a fuel customer even exits their vehicle).

A user can then initiate a transaction with the payment terminal, for example by dispensing fuel from a fuel dispenser coupled to the payment terminal or by pressing a button or actuating some other user interface element of the payment terminal. The payment terminal can include provisions for ensuring that the user who is initiating a transaction is authorized to use the payment features of the mobile device, which can prevent use of such features when the mobile device is stolen or otherwise compromised. For example, once a transaction is initiated by the user, the payment terminal can prompt the user for authorization information. The authorization information can include a personal identification number (PIN), a password, biometric data such as a fingerprint or face image, or any other information that can be used to ensure that a user is an authorized user of the mobile device's payment features. This authorization information can then be encrypted by the payment terminal using the session key and transmitted to the mobile device for validation.

In some instances, a plurality of a mobile devices with enabled payment features can be within range of the payment terminal at the same time (e.g., in the case of a busy frontcourt at a fueling station), and therefore the payment terminal can have a plurality of sets of customer information stored therein. Accordingly, the payment terminal can also prompt the user for a user identification (e.g., the user's name or an account name set up by the user), which can be cross-referenced with the customer information received by the payment terminal from the in-range mobile devices to determine which of the plural mobile devices is associated with the user that initiated the transaction.

In some instances, the user's mobile device can be set up with payment information for a plurality of payment types (e.g., information for multiple credit or debit cards) and/or loyalty information for a plurality of loyalty relationships, and can transfer the payment information for each of the payment types and the loyalty information for each of the loyalty relationships to the payment terminal. Accordingly, the payment terminal can also prompt the user for a payment type and/or loyalty type to be used. In other words, the payment terminal can allow the user to select which of the plurality of payment types or loyalty types set up in the mobile device should be used to complete the transaction.

Once the user enters the required information, the payment terminal encrypts the entered authorization information using the session key and transmits it to the mobile device for validation. When multiple mobile devices are in range, the payment terminal can send the encrypted authorization information only to the mobile device associated with the user identification provided by the user. When multiple payment or loyalty options are available from the mobile device, the payment terminal can send the user's selection of payment or loyalty type to the mobile device with the encrypted authorization information. The payment or loyalty type information can be sent in encrypted or unencrypted form.

The mobile device then decrypts the authorization information received from the payment terminal using the session key and compares the received authorization information to master authorization information stored in the mobile device. If a match is found, the user is an authorized user of the mobile device and the mobile device can send a positive validation result to the payment terminal. If no match is found, the user is not authorized and the mobile device can send a negative validation result to the payment terminal.

When the payment terminal receives a positive validation result from the mobile device, the transaction is completed using the customer information previously received from the mobile device and now stored in the payment terminal. When the payment terminal receives a negative validation result from the mobile device, the payment terminal can refuse the transaction or allow the user to try entering the authorization information again, in which case the above process is repeated to validate the newly-entered authorization information with the mobile device.

After the transaction is complete, the user information stored in the payment terminal can be deleted. The user can also be prompted for a printed or electronic receipt and, if the user opts for an electronic receipt, the payment terminal can transmit an electronic receipt to the mobile device where it can be subsequently retrieved by the user. The receipt can be encrypted using the session key. The payment terminal can also be configured to delete user information stored therein when communication is lost with the mobile device (e.g., when the mobile device leaves the communications range of the payment terminal) or when a predetermined time elapses without a transaction being initiated (e.g., at least about 30 minutes).

In the above method, the two-way authentication process ensures that the mobile device transfers sensitive user information only to a trusted, authenticated payment terminal. This sensitive user information can be encrypted between the mobile device and the payment terminal to prevent interception by malicious parties. Similarly, the two-way authentication process ensures that the payment terminal only accepts transaction payments from a trusted, authenticated mobile device.

In addition, most of the customer information (e.g., payment and loyalty data) is transferred to the payment terminal automatically without any user interaction with the mobile device. Accordingly, the lost time and inconvenience associated with locating and reaching for the mobile device, launching apps or activating payment features, and so forth is eliminated. A user can complete an entire transaction without ever touching or interacting with the mobile device. In other words, a transaction can be completed without any physical interaction between the user and the mobile device before, during, or after the transaction. The payment process is also expedited since the user's customer information is already stored in the payment terminal by the time the user initiates a transaction, saving time that would otherwise be required to authenticate and transfer the information.

Finally, the above method can alleviate concerns regarding the use of mobile devices in proximity to a fuel dispenser. Some fueling stations ban such use since it is alleged that mobile devices can generate electrical events that may cause fire. The above method does not require any interaction between the user and the mobile device, and therefore the user can leave the mobile device in their pocket, purse, vehicle, or other location and eliminate any concern of the mobile device being a fire hazard.

Exemplary devices or structures for carrying out the above method are discussed in detail below, along with variations on the above method.

Computer System

Figure 3:
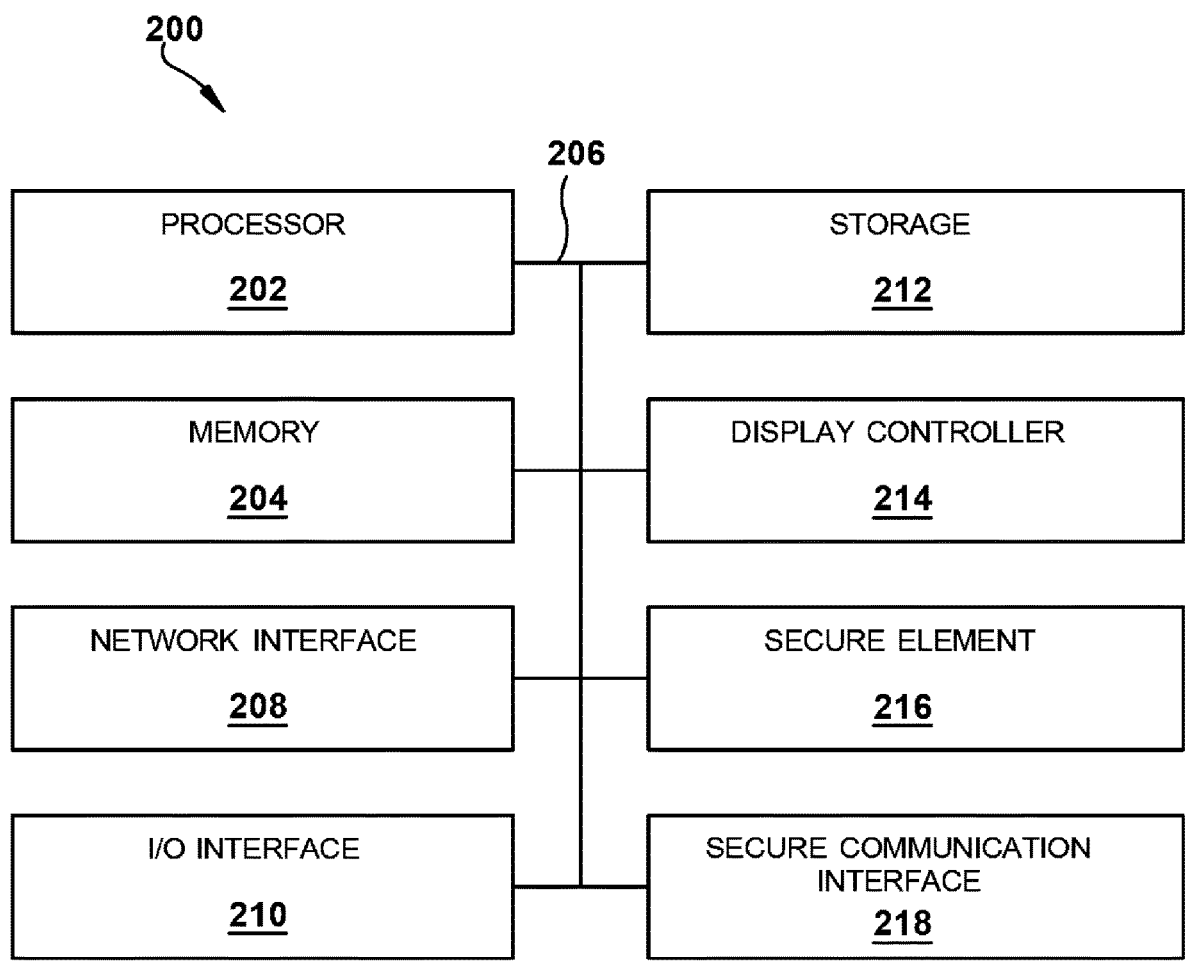
FIG. 3 is a schematic diagram of one exemplary embodiment of a computer system.

FIG. 3 illustrates an exemplary architecture of a computer system 200 which can be used to implement the payment terminal 102 or mobile device 104 of FIG. 1. Although an exemplary computer system 200 is depicted and described herein, it will be appreciated that this is for sake of generality and convenience. In other embodiments, the computer system may differ in architecture and operation from that shown and described here.

The computer system 200 can include a processor 202 which controls the operation of the computer system 200, for example by executing an operating system (OS), device drivers, application programs, and so forth. The processor 202 can include any type of microprocessor or central processing unit (CPU), including programmable general-purpose or special-purpose microprocessors and/or any of a variety of proprietary or commercially-available single or multi-processor systems.

The computer system 200 can also include a memory 204, which provides temporary or permanent storage for code to be executed by the processor 202 or for data that is processed by the processor 202. The memory 204 can include read-only memory (ROM), flash memory, one or more varieties of random access memory (RAM), and/or a combination of memory technologies.

The various elements of the computer system 200 can be coupled to one another. For example, the processor 202 can be coupled to the memory 204. The various elements of the computer system 200 can be directly coupled to one another or can be coupled to one another via one or more intermediate components. In the illustrated embodiment, the various elements of the computer system 200 are coupled to a bus system 206. The illustrated bus system 206 is an abstraction that represents any one or more separate physical busses, communication lines/interfaces, and/or multi-drop or point-to-point connections, connected by appropriate bridges, adapters, and/or controllers.

The computer system 200 can also include a network interface 208 which enables the computer system 200 to communicate with remote devices (e.g., other computer systems) over a network. In the case of the payment terminal 102, the network interface can facilitate communication with the fueling loyalty network 108, and the fueling payment network 110, for example via an Ethernet, Wi-Fi, or cellular data network.

The computer system 200 can also include an input/output (I/O) interface 210 which facilitates communication between one or more input devices, one or more output devices, and the various other components of the computer system 200. Exemplary input and output devices include keypads, touchscreens, buttons, magnetic-stripe card readers, lights, speakers, and so forth.

The computer system 200 can also include a storage device 212, which can include any conventional medium for storing data in a non-volatile and/or non-transient manner. The storage device 212 can thus hold data and/or instructions in a persistent state (i.e., the value is retained despite interruption of power to the computer system 200). The storage device 212 can include one or more hard disk drives, flash drives, USB drives, optical drives, various media disks or cards, memory technologies, and/or any combination thereof and can be directly connected to the other components of the computer system 200 or remotely connected thereto, such as over a network.

The computer system 200 can also include a display controller 214 which can include a video processor and a video memory, and can generate images to be displayed on one or more electronic displays in accordance with instructions received from the processor 202.

The computer system 200 can also include a secure element 216. The secure element 216 can be a tamper-resistant platform (e.g., a one-chip secure microcontroller) capable of securely hosting applications and their confidential and cryptographic data (e.g., key management) in accordance with the rules and security requirements set forth by a set of well-identified trusted authorities. The secure element 216 can be capable of providing random number generation, generating device-specific public/private key pairs, and executing a security algorithm. Known examples of security algorithms include, but are not limited to: Hash, TDES, AES, RSA, etc. Exemplary secure elements 216 include Universal Integrated Circuit Cards (UICC), embedded secure elements, and micro secure digital (microSD) cards. The secure element 216 can be or can include a storage device.

The computer system 200 can also include a secure communication interface 218 through which the computer system 200 can conduct mutual authentication procedures and communicate with other computer systems. The secure communication interface 218 can be wireless (e.g., near-field communication (NFC), Wi-Fi, Bluetooth, Bluetooth LE, ZigBee, and the like) or wired (e.g., USB or Ethernet). In the case of NFC, for example, the computer system 200 can include a radio transceiver configured to communicate with a radio transceiver of another device using one or more standards such as ISO/IEC 14443, FeliCa, ISO/IEC 18092, and those defined by the NFC Forum. The secure communication interfaces 218 of the payment terminal 102 and the mobile device 104 can be selected to provide the desired communication range. In some embodiments, Bluetooth (e.g., class 2 Bluetooth having a range of 5-10 meters) can be used for the secure communication interface 218 to allow the mobile device 104 to remain somewhat distant from the payment terminal 102 (e.g., in a user's pocket, purse, or vehicle) while at the same time limiting the communication range such that malicious parties cannot attack the system from a great distance and such that mobile devices of passing motorists or distant mobile devices unlikely to be used for a transaction are not needlessly authenticated with the payment terminal.

Modules Generally

The various functions performed by the payment terminal 102 and the mobile device 104 can be logically described as being performed by one or more modules or units. It will be appreciated that such modules can be implemented in hardware, software, or a combination thereof. It will further be appreciated that, when implemented in software, modules can be part of a single program or one or more separate programs, and can be implemented in a variety of contexts (e.g., as part of an operating system, a device driver, a standalone application, and/or combinations thereof). In addition, software embodying one or more modules can be stored as an executable program on one or more non-transitory computer-readable storage mediums, or can be transmitted as a signal, carrier wave, etc. Functions disclosed herein as being performed by a particular module can also be performed by any other module or combination of modules, and the payment terminal 102 and the mobile device 104 can include fewer or more modules than what is shown and described herein. As used herein, software refers to any executable program instructions, including firmware.

Payment Terminal Modules

Figure 4:
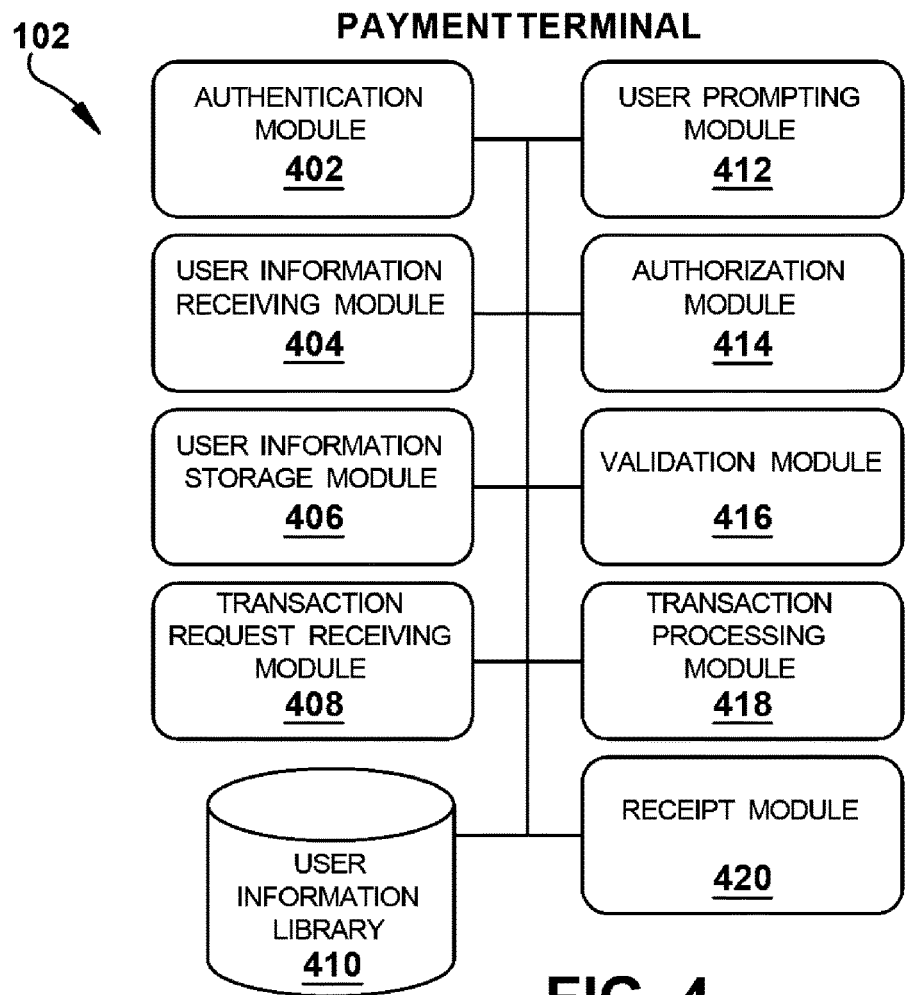
FIG. 4 is a schematic diagram of one exemplary embodiment of a payment terminal.

FIG. 4 is a schematic diagram of the modules of one exemplary embodiment of the payment terminal 102. As shown, the payment terminal 102 can include an authentication module 402, a user information receiving module 404, a user information storage module 406, a transaction request receiving module 408, a user information library 410, a user prompting module 412, an authorization module 414, a validation module 416, a transaction processing module 418, and a receipt module 420.

The authentication module 402 can be configured to execute a mutual authentication process with the mobile device 104. In particular, the authentication module 402 can be configured to interact with an authentication module 502 of the mobile device 104 using the secure communication interface 218 of the payment terminal 102 to execute a mutual authentication process. An exemplary mutual authentication process is described in detail below.

The user information receiving module 404 can be configured to receive user information from a payment device (e.g., a mobile device 104) via the secure communication interface 218 of the payment terminal 102. The user information can include payment information, such as credit or debit card numbers, card expiration dates, security codes, cardholder names, EMV® data, and so forth. The user information can also include loyalty information, such as loyalty account numbers, account names, and so forth. The received user information can be encrypted by the mobile device 104 before transmission to the payment terminal 102 occurs. The user information receiving module 404 can be configured to decrypt the received user information using a session key generated during the mutual authentication process executed by the authentication module 402.

The decrypted user information can be stored by the user information storage module 406 in the user information library 410, which can be maintained in the secure element 216 or other storage device 212 of the payment terminal 102. The user information storage module 406 can store information associated with a plurality of users, e.g., when a plurality of mobile devices 104 are within range of and successfully authenticated with the payment terminal 102. The user information storage module 406 can be configured to delete or erase stored user information, for example when communication between the payment terminal 102 and the mobile device 104 ceases (e.g., because a transaction is completed or because the mobile device exits the communication range of the payment terminal) or when a predetermined time elapses after receipt of the user information without a transaction being initiated by the user. Thus, if a mobile device 104 is authenticated, communicates user information to the payment terminal 102, and then exits the communications range of the payment terminal, the user information storage module 406 can delete the received user information. Similarly, if a mobile device 104 is authenticated, communicates user information the payment terminal 102, and then sufficient time elapses without the user initiating or completing a transaction, the user information storage module 406 can delete the received user information.

The transaction request receiving module 408 can be configured to receive a request to initiate a transaction from a user. For example, the transaction request receiving module 408 can detect a user's actuation of a button, keypad, softkey, touchscreen, or other user interface element of the payment terminal 102 in an effort to initiate a transaction (e.g., dispensing and purchasing fuel).

When a transaction request is received by the transaction request receiving module 408, the user prompting module 412 can be configured to prompt the user for any additional information that is required to confirm that the user is an authorized user or to complete the transaction. The user prompting module 412 can drive an electronic display, speaker, or other output device of the payment terminal 102 to display a prompt to the user. Exemplary information for which the user can be prompted include authorization information for verifying that the user is an authorized user of the mobile device 104, user identification information for determining which of a plurality of sets of user information stored in the user information library 410 belong to the user, and/or payment or loyalty type information for determining which of a plurality of payment or loyalty information stored in association with the user should be used to complete the transaction. The user prompting module 412 can also be configured to receive information for which the user is prompted. For example, the user prompting module 412 can receive user input provided by the user's actuation of a button, keypad, softkey, touchscreen, fingerprint scanner, camera, etc.

The authorization module 414 can be configured to transmit various types of information to the mobile device 104 using the secure communication interface 218 of the payment terminal 102. For example, user authorization information prompted for and received by the user prompting module 412 can be encrypted by the authorization module 414 and forwarded to the mobile device 102 for validation.

When a plurality of mobile devices 104 are in communication with the payment terminal 102, the authorization module 414 can determine which of the plurality of mobile devices to send the authorization information to based on user identification information receiving by user prompting module 412. In particular, the authorization module 414 can compare the received identification information with identification information stored in the user information library 410 in association with the various sets of user information stored therein. The authorization information can thus be sent only to the mobile device that provided user information having a user identification that matches the user identification provided by the user requesting a transaction. If none of the mobile devices provided matching information, an error can be reported to the user and the user can optionally be prompted for new authorization information and/or new identification information.

When the user information associated with the user requesting a transaction includes data for a plurality of payment types and/or a plurality of loyalty types, the authorization module 414 can transmit a payment or loyalty type indication to the mobile device 104 along with the authorization information. The payment or loyalty type indication can be based on the payment type or loyalty type selection received by the user prompting module 412.

The authorization module 414 can be configured to encrypt the authorization information and/or payment or loyalty type information before sending it to the mobile device 104. In particular, the authorization and/or payment or loyalty type information can be encrypted using the session key generated during the mutual-authentication process conducted by the authentication module 402.

The validation module 416 can be configured to receive a validation result from the mobile device 104 using the secure communication interface 218 of the payment terminal 102 after the mobile device assesses the validity of the information provided by the authorization module 414. If a positive validation result is received, the transaction processing module 418 can execute the requested transaction by processing the user's payment and/or loyalty information as stored in the library 410 with the fueling payment network 110 and/or fueling loyalty network 108 using known techniques. If a negative validation result is received, the user prompting module 412 can prompt the user to re-enter the authorization information, or can report an error to the user and terminate the transaction.

The receipt module 420 can be configured to generate a receipt that indicates one or more parameters of the transaction. For example, the receipt module 420 can control a receipt printer of the payment terminal 102 to print a paper receipt which can be retrieved by the user. The user prompting module 412 can also ask the user whether an electronic receipt is desired, in which case the receipt module 420 can communicate an electronic receipt to the mobile device 104 using the secure communication interface 218 of the payment terminal 102. The user can then retrieve the electronic receipt from the mobile device 104 at their convenience.

Mobile Device Modules

Figure 5:
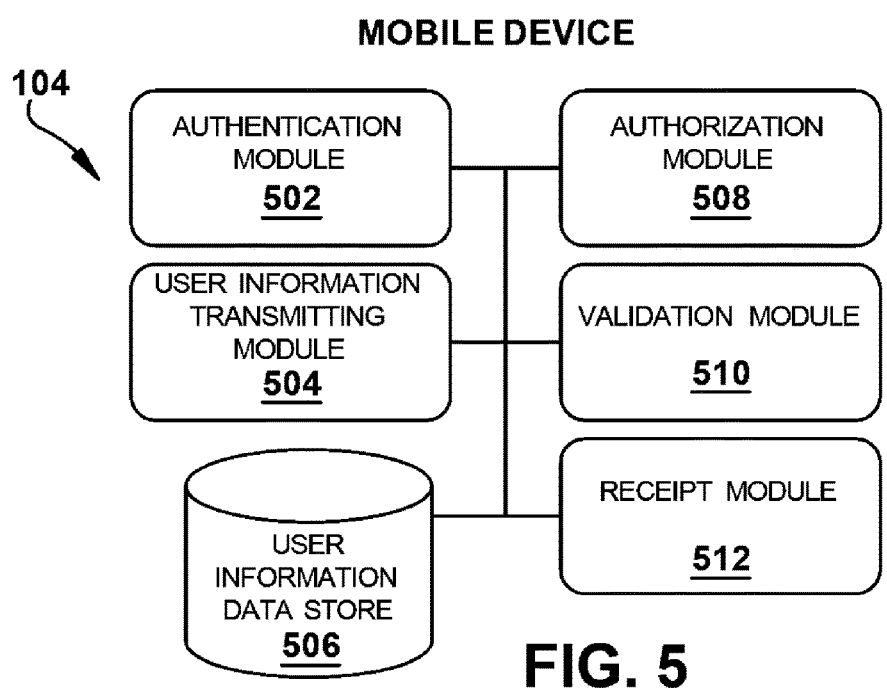
FIG. 5 is schematic diagram of one exemplary embodiment of a mobile device.

FIG. 5 is a schematic diagram of the modules of one exemplary embodiment of the mobile device 104. As shown, the mobile device 104 can include an authentication module 502, a user information transmitting module 504, a user information data store 506, an authorization module 508, a validation module 510, and a receipt module 512.

The authentication module 502 can be configured to execute a mutual authentication process with the payment terminal 102. In particular, the authentication module 502 can be configure to interact with the authentication module 402 of the payment terminal 102 using the secure communication interface 218 of the mobile device 104 to execute a mutual authentication process. An exemplary mutual authentication process is described in detail below.

The user information transmitting module 504 can be configured to transmit user information to the payment terminal 102 via the secure communication interface 218 of the mobile device 104. The user information can include payment information, such as credit or debit card numbers, card expiration dates, security codes, cardholder names, EMV® data, and so forth. The user information can also include loyalty information, such as loyalty account numbers, account names, and so forth. The user information can also include a username or other user identification, which can be compared to a user identification entered by a user of the payment terminal 102 to determine which of a plurality of sets of user information received by the payment terminal is associated with that user. The transmitted user information can be encrypted by the mobile device 104 before transmission to the payment terminal 102 occurs using a session key generated during the mutual authentication process executed by the authentication module 502.

The user information can be stored in the user information data store 506, which can be maintained in the secure element 216 or other storage device 212 of the mobile device 104. A user of the mobile device 104 can add or remove information from the user information data store 506 using an application executed on the mobile device and one or more user interface elements of the mobile device. For example, a user can add a credit card to a "digital wallet" application executed by the mobile device 104 to store the credit card information in the user information data store 506.

The authorization module 508 can be configured to receive various types of information from the payment terminal 102 via the secure communication interface 218 of the mobile device 104. For example, user authorization information such as a personal identification number (PIN), a password, biometric data such as a fingerprint or face image, or any other information that can be used to ensure that a user is an authorized user of the mobile device's payment features can be received from the payment terminal 102.

When the user information sent to the payment terminal 102 includes data for a plurality of payment types and/or a plurality of loyalty types, the authorization module 508 can receive a payment or loyalty type indication from the payment terminal along with the authorization information. The payment or loyalty type indication can be used by the validation module 510, as discussed below. The authorization module 508 can be configured to decrypt the authorization information and/or payment or loyalty type information received from the payment terminal 102. In particular, the authorization and/or payment or loyalty type information can be decrypted using the session key generated during the mutual authentication process conducted by the authentication module 502.

The validation module 510 can be configured to generate a validation result and transmit the validation result to the payment terminal 102 using the secure communication interface 218 of the mobile device 104. In particular, the validation module 510 can compare the authorization information received by the authorization module 508 to valid or master authorization information stored in the mobile device 104, e.g., in the secure element 216 of the mobile device. When multiple payment and/or loyalty types are stored in the mobile device 104, the validation module 510 can determine which payment or loyalty type's valid authorization information should be used for the comparison based on the payment or loyalty type indication received by the authorization module 508. When the received authorization information matches the valid authorization information, a positive validation result is generated and transmitted to the payment terminal 102. When the received authorization information does not match the valid authorization information, a negative validation result is generated and transmitted to the payment terminal 102.

The receipt module 512 can be configured to receive an electronic receipt from the payment terminal 102 via the secure communication interface 218 of the mobile device 104 (e.g., upon successful completion of a transaction). The receipt module 512 can also be configured to display the receipt to a user using an electronic display of the mobile device 104, or to transmit the receipt electronically via email, text message, or other techniques.

Operation

Figure 6:
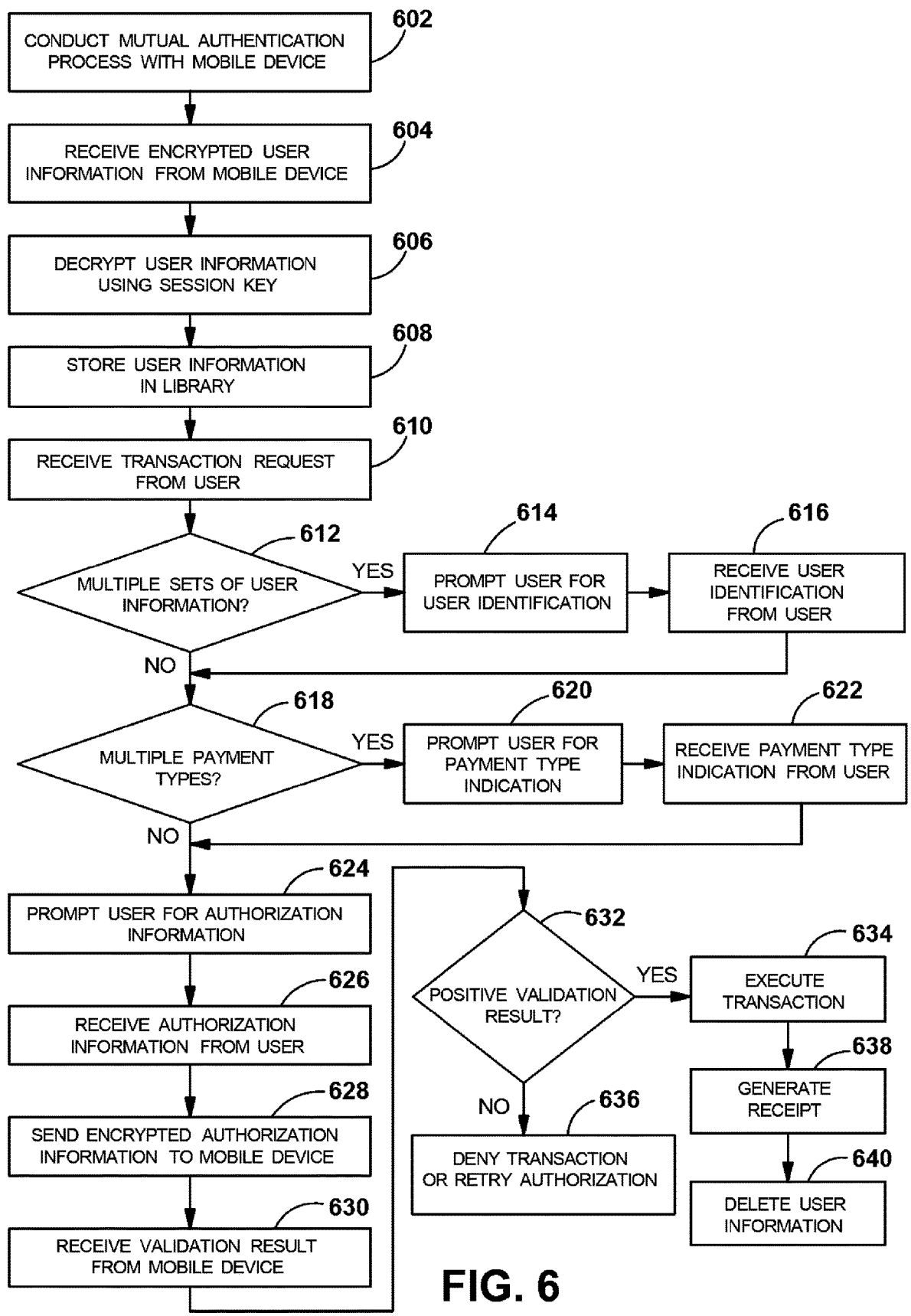
FIG. 6 a flowchart that depicts the method of FIG. 2 from the perspective of the payment terminal.
Figure 7:
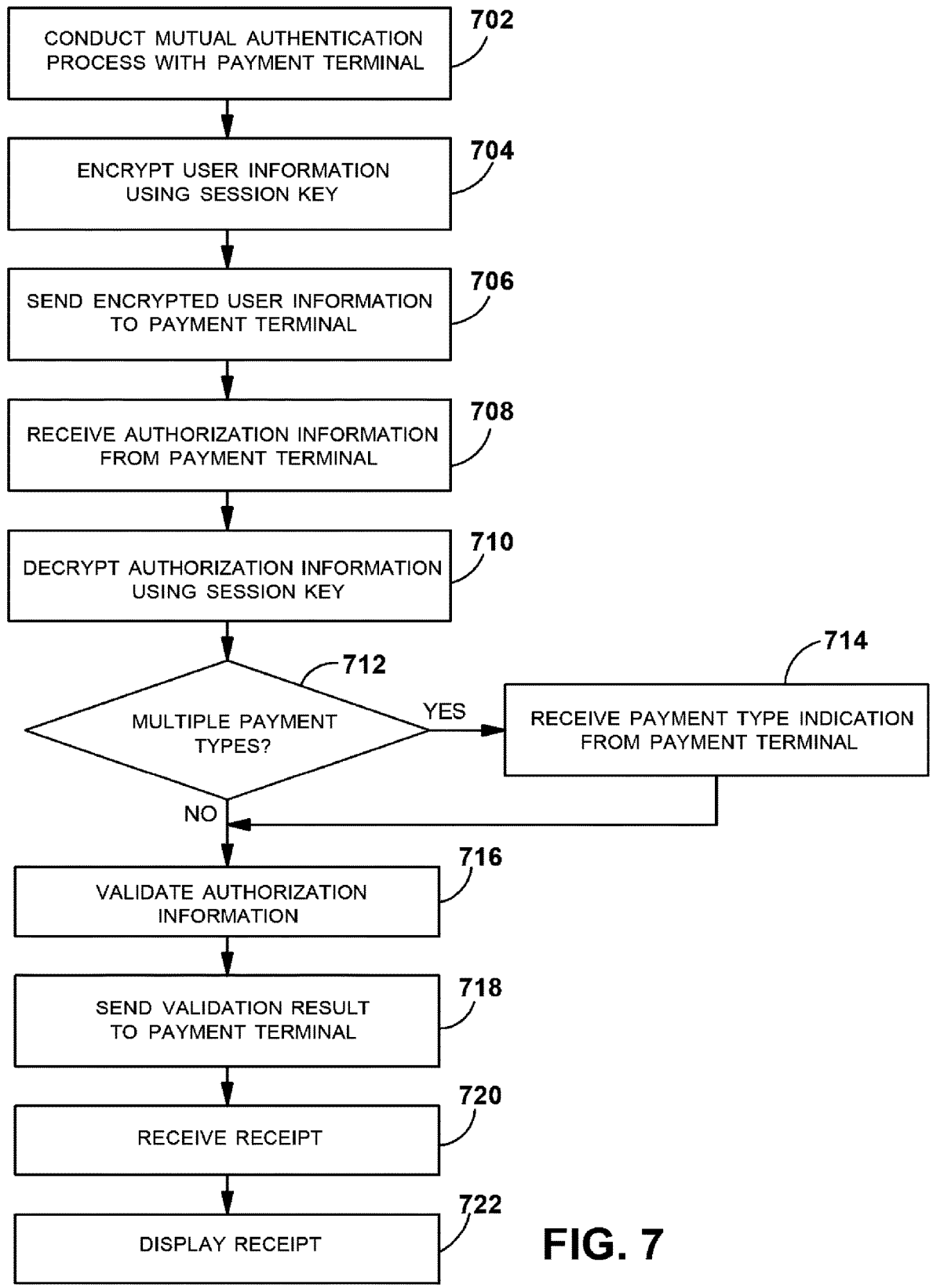
FIG. 7 is a flowchart that depicts the method of FIG. 2 from the perspective of the mobile device.

An exemplary method of conducting a secure and convenience mobile payment transaction is illustrated schematically in FIGS. 6-7. FIG. 6 provides an overview of the method from the perspective of the payment terminal 102. Initially, in step 602, the payment terminal 102 initiates and completes a mutual authentication process with a mobile device 104 that is in range, or completes a mutual authentication process initiated by the mobile device 104. In particular, the authentication module 402 of the payment terminal 102 cooperates with the authentication module 502 of the mobile device 104 to complete a mutual authentication process. In step 604, the user information receiving module 404 of the payment terminal 102 receives encrypted user information from the user information transmitting module 504 of the mobile device 104. In step 606, the payment terminal 102 decrypts the user information using a session key generated in step 602. The user information is then stored in step 608 in the user information library 410 of the payment terminal 102. If no transaction request is received within a predetermined time period, or if communication ceases between the mobile device 104 and the payment terminal 102, the user information stored in the payment terminal can be deleted.

In step 610, the transaction request receiving module 408 of the payment terminal 102 receives a transaction request from a user. If multiple sets of user information are stored in the library 410 at step 612, the user prompting module 412 prompts the user for user identification in step 614 and receives the user identification in step 616. If multiple payment and/or loyalty types are stored for the user at step 618, the user prompting module 412 prompts the user for a payment or loyalty type indication at step 620 and receives the payment or loyalty type indication at step 622. In step 624, the user prompting module 412 prompts the user for authorization information and receives the authorization information in step 626. The authorization module 414 then encrypts the authorization information and sends it to the authorization module 508 of the mobile device 104 in step 628. In step 630, the validation module 416 of the payment terminal 102 receives a validation result from the validation module 510 of the mobile device 104. If the validation result is positive at step 632, the transaction processing module 418 of the payment terminal 102 completes the transaction in step 634. If the validation result is negative at step 632, the transaction processing module 418 denies the transaction or retries the authorization process in step 636. When a transaction is completed, the receipt module 420 can generate a receipt in step 638 and user information stored in the payment terminal 102 can be deleted in step 640.

FIG. 7 provides an overview of the method from the perspective of the mobile device 104. Initially, in step 702, the mobile device 104 initiates and completes a mutual authentication process with a payment terminal 102 that is in range, or completes a mutual authentication process initiated by the payment terminal 102. In particular, the authentication module 502 of the mobile device 104 cooperates with the authentication module 402 of the payment terminal 102 to complete a mutual authentication process. In step 704, the user information transmitting module 504 encrypts user information stored in the user information data store 506 of the mobile device 104 using a session key generated in step 702. The user information transmitting module 504 sends the encrypted user information to the user information receiving module 404 of the payment terminal 102 in step 706. In step 708, the authorization module 508 of the mobile device 104 receives authorization information from the authorization module 414 of the payment terminal 102. The authorization information is decrypted in step 710 using the session key generated in step 702. If multiple payment types and/or loyalty types are stored in the user information data store 506 at step 712, the authorization module 508 of the mobile device 104 receives a payment or loyalty type indication from the authorization module 414 of the payment terminal 102 in step 714. In step 716, the validation module 510 of the mobile device 104 compares the received authorization information to stored authorization information for the indicated payment or loyalty type. If a match is found, the validation module 510 of the mobile device 104 sends a positive validation result to the validation module 416 of the payment terminal 102 in step 718. If no match is found, the validation module 510 of the mobile device 104 sends a negative validation result to the validation module 416 of the payment terminal 102 in step 718. When a transaction is successfully completed, or in any other situation in which a receipt is generated, the receipt can be received by the receipt module 512 of the mobile device 104 in step 720 and displayed to the user in step 722.

The method of FIGS. 6-7 can thus permit the payment terminal 102 and the mobile device 104 of FIG. 1 to engage in and complete a secure and convenient mobile payment transaction.

Mutual Authentication Process

In one or more of the systems and methods described above, a two-way or mutual authentication process is used to ensure that the mobile device transfers sensitive customer information only to a trusted, authenticated payment terminal and to ensure that that the payment terminal only accepts transaction payments from a trusted, authenticated mobile device. Sensitive customer information can be encrypted between the mobile device and the payment terminal to prevent interception by malicious parties.

Any of a variety of mutual authentication processes can be used to obtain this result. The mutual authentication process can, in some embodiments, involve only a single exchange between the payment terminal 102 and the mobile device 104 (e.g., an authentication request transmitted from the mobile device 104 to the payment terminal 102 and an authentication response transmitted from the payment terminal 102 to the mobile device 104). To begin this process, the mobile device 104 sends an authentication request to the payment terminal 102. The authentication request can include an encrypted, device-specific public key of the mobile device 104 and a random number R1 encrypted by the mobile device's private key. The request can also include a unique identifier that specifies the chain of public keys in a trust hierarchy required to decrypt the public key of the mobile device 104.

Upon receipt of the authentication request, the payment terminal 102 can use a set of pre-authenticated public keys to decrypt the public key of the mobile device 104, which can then be used to decrypt the random number R1. Otherwise, the payment terminal 102 can use public keys higher in the trust hierarchy or attempt to obtain the requisite public key (e.g., over a network). The payment terminal 102 can then generate a session key S1 based on the random number R1 and a random number R2 generated by the payment terminal, as well as a checksum CHKS1 of the session key. The session key S1 can be encrypted by the mobile device's public key, such that only the private key stored in the mobile device's secure element 216 can be used to decrypt and obtain the session key S1. The checksum CHKS1 can be encrypted using the payment terminal's own device-specific private key. The payment terminal 102 can then send an authentication response to the mobile device 104 that includes an encrypted, device-specific public key of the payment terminal 102 and the encrypted session key S1 and checksum CHKS1. The request can also include a unique identifier that specifies the chain of public keys required to decrypt the public key of the payment terminal 102.

Upon receipt of the authentication response, the mobile device 104 can use a set of pre-authenticated public keys to decrypt the public key of the payment terminal 102, which can then be used to decrypt the checksum CHKS1. Otherwise, the mobile device 104 can use public keys higher in the trust hierarchy or attempt to obtain the requisite public key (e.g., over a network). The mobile device 104 can also decrypt the session key S1 using its own device-specific private key. If the checksum CHKS1 and the session key S1 match, both the mobile device 104 and the payment terminal 102 are in possession of the agreed upon session key S1 and the mutual-authentication process is complete. The session key S1 can then be used to encrypt and decrypt user data transmitted between the mobile device 104 and the payment terminal 102.

An exemplary mutual authentication process which can be used in the systems and methods disclosed herein is detailed in U.S. application Ser. No. 13/890,734, filed on May 9, 2013 and entitled SYSTEMS AND METHODS FOR SECURE COMMUNICATION, which is hereby incorporated by reference herein in its entirety.

Figure 8:
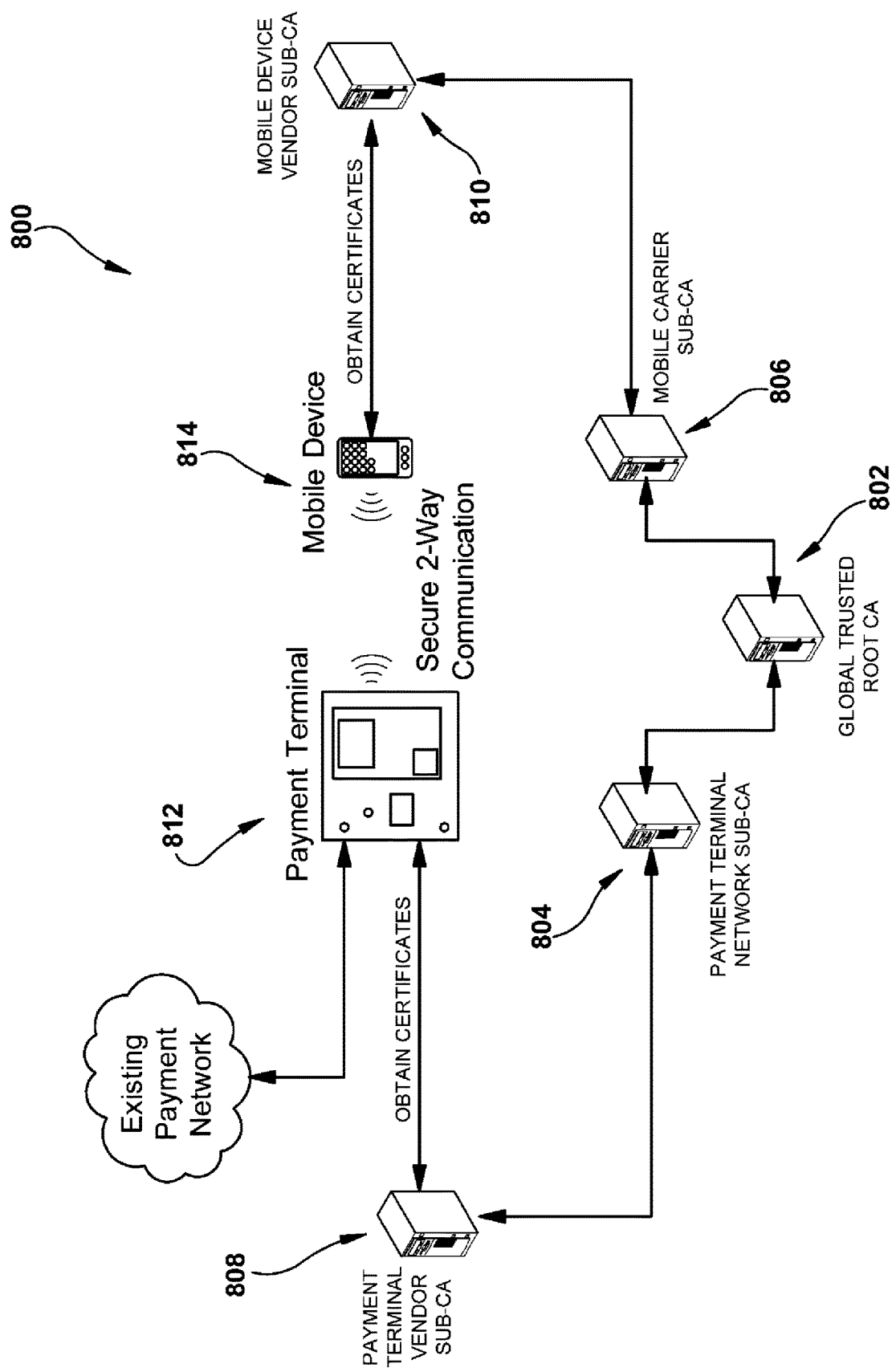
FIG. 8 is a schematic diagram of one exemplary certificate or key scheme for carrying out a mutual authentication process.

FIG. 8 is illustrates an exemplary trust hierarchy 800 which can be used in the mutual authentication process described above. As shown, the hierarchy 800 can include a root certificate 802 that identifies an industry-standard Root Certificate Authority (Root CA). Exemplary Root CAs include VeriSign, GlobalSign, DigiCert, and the like. The root certificate 802 forms the trust root for the certificate hierarchy 800, and can be an unsigned public key certificate or a self-signed certificate. Trustworthiness of the root certificate 802 can be established by secure physical distribution, e.g., during production of the payment terminal 102. For convenience of description, the root certificate 802 is referred to herein as a level 1 or "L1" certificate. It will be appreciated that the hierarchy 800 can include a plurality of L1 certificates, e.g., issued from a plurality of different Root CAs.

The certificate hierarchy can also include one or more levels of subordinate certificates which are signed by a superior certificate authority and thereby inherit the trustworthiness of the superior certificate authority. In the illustrated embodiment, for example, the hierarchy 800 includes one or more payment terminal network certificates 804 issued from payment networks such as card-issuing banks, acquirers, or other payment processors. The illustrated hierarchy 800 also includes one or more mobile carrier certificates 806 issued from mobile carriers. For convenience of description, the payment terminal network certificates 804 and the mobile carrier certificates 806 are referred to herein as level 2 or "L2" certificates. The L2 certificates are immediately-subordinate to the L1 certificates, and can therefore be signed by the Root CA to inherit the Root CA's trustworthiness.

The hierarchy can also include certificates which are subordinate to the L2 certificates. In the illustrated embodiment, for example, the hierarchy 800 includes one or more payment terminal vendor certificates 808 issued from manufacturers or distributors of payment terminals. The hierarchy 800 can also include one or more mobile device vendor certificates 810 issued from manufacturers or distributors of mobile devices. For convenience of description, the payment terminal vendor certificates 808 and the mobile device vendor certificates 810 are referred to herein as level 3 or "L3" certificates. The L3 certificates are immediately-subordinate to the L2 certificates, and can therefore be signed by a L2 certificate authority to inherit the L2 certificate authority's trustworthiness.

The hierarchy 800 can also include a device-specific certificate 812 unique to the individual payment terminal and a device-specific certificate 814 unique to the individual mobile device. For convenience of description, the device-specific certificates are referred to herein as level 4 or "L4" certificates. The L4 certificates can be signed by a L3 certificate authority to inherit the L3 certificate authority's trustworthiness.

The root certificates 802, payment terminal network certificates 804, payment terminal vendor certificates 808, and the payment terminal certificate 812 can be referred to as "terminal-side" certificates. The root certificates 802, mobile carrier certificates 806, mobile device vendor certificates 810, and the mobile device certificate 814 can be referred to as "mobile-side" certificates. Certificates can be referred to as "superior certificates," "more-superior certificates", "inferior certificates", "more-inferior certificates," and so forth based on their position within the hierarchy 800 and the certificate whose perspective is being described. For example, from the perspective of a L4 certificate, a L3 certificate can be referred to as a superior certificate and a L2 certificate can be referred to as a more-superior certificate. Likewise, from the perspective of a L4 certificate, a L2 certificate can be referred to as a superior certificate and a L1 certificate can be referred to as a more-superior certificate. While a four-level certificate hierarchy 800 is shown and described herein, it will be appreciated that the hierarchy can include any number of levels.

In some embodiments, the certificate hierarchy 800 can be part of a public key infrastructure (PKI), for example according to the X.509 industry standard. A PKI uses public key/private key pairs to securely encrypt and decrypt information. A public key can be freely distributed and can be used to encrypt the information. To decrypt the information, however, a party must possess a private key associated with the public key. An exemplary public key/private key encryption algorithm is the RSA cryptography system. A digital certificate can include a public key and a digital signature. The digital signature is created using a party's private key, such that anyone with access to the party's public key can prove that the signer had access to the party's private key and therefore that the signature is authentic.

Thus, in the example above, the Root CA stores a private key in a highly-secure location. The root certificate 802 includes the public key that corresponds to the private key and a digital signature signed by the Root CA using the private key. A known-good root certificate 802 can be installed in a controlled environment (e.g., during manufacture) such that the certificate can be trusted. Other certificates in the system can be trusted or authenticated based on a hierarchical system of cryptographic keys and digital signatures that traces back to the root certificate, as will be appreciated by those skilled in the art.

In the mutual authentication process above, each party can verify the other's public key using the certificate hierarchy that traces back to a common root trust authority. In particular, the payment terminal 102 and the mobile device 104 can exchange their respective public keys at run-time as long as both sides can trace the given certificate hierarchy to a common trusted Root CA.

Figure 9:
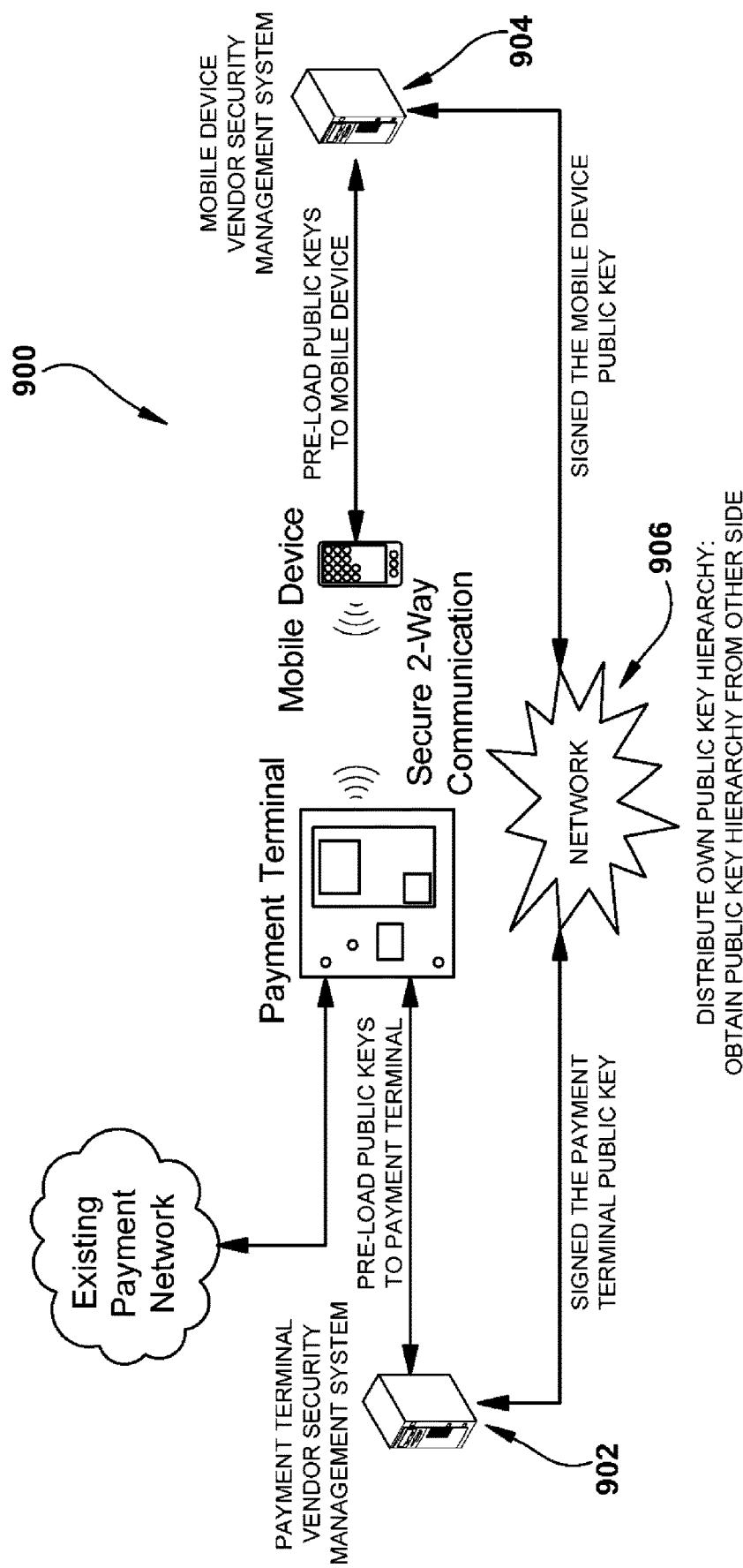
FIG. 9 is a schematic diagram of another exemplary certificate or key scheme for carrying out a mutual authentication process.

FIG. 9 illustrates an alternative trust hierarchy 900 which can be used in some embodiments of the mutual authentication process. In the embodiment of FIG. 9, both the payment terminal 102 and the mobile device 104 can eliminate the PKI certificate hierarchy by pre-loading the trusted public key hierarchy instead. In particular, instead of maintaining the CA hierarchy, each side has its own security management system 902, 904 in house and is responsible for signing the unique device-specific public key (either the public key specific to the individual payment terminal 102 or the public key specific to the individual mobile device 104) using its own root key. Both the payment terminal vendor/manufacturer and the mobile device vendor/manufacturer can exchange their root public key over a network 906 (e.g., the Internet), e.g., after the payment terminal 102 and the mobile device 104 have sensed each other within communications range, and pre-load the given public key(s) to the unit (payment terminal or mobile device) in preparation for an eventual transaction. At run-time (or when the customer is initiating the transaction at the payment terminal), the payment terminal can simply authenticate the given signed public key with the given root public key. In some embodiments, the pre-loaded PKI public key system 900 of FIG. 9 can be less costly to maintain than the complete PKI certificate hierarchy 800 of FIG. 8.

ADVANTAGES/TECHNICAL EFFECTS

The systems and methods disclosed herein can produce a number of advantages and/or technical effects.

For example, in some embodiments, a mutual authentication process ensures that the mobile device transfers sensitive user information only to a trusted, authenticated payment terminal and that the payment terminal only accepts transaction payments from a trusted, authenticated mobile device. Sensitive user information can be encrypted between the mobile device and the payment terminal to prevent interception by malicious parties.

By way of further example, in some embodiments, the customer information (e.g., payment and loyalty data) is transferred to the payment terminal automatically without any user interaction with the mobile device. Accordingly, the lost time and inconvenience associated with locating and reaching for the mobile device, launching apps or activating payment features, and so forth is eliminated. A user can complete an entire transaction without ever touching or interacting with the mobile device. In other words, a transaction can be completed without any physical interaction between the user and the mobile device before, during, or after the transaction. The payment process is also expedited since the user's customer information is already stored in the payment terminal by the time the user initiates a transaction, saving time that would otherwise be required to authenticate and transfer the information.

As yet another example, in some embodiments, concerns regarding the use of mobile devices in proximity to a fuel dispenser can be alleviated, since the mobile device can be kept in a safe place throughout a fueling transaction.

While various methods disclosed herein may be shown in relation to flowcharts or sequence diagrams, it should be noted that any ordering of method steps implied by such flowcharts, sequence diagrams, or the description thereof is not to be construed as limiting the method to performing the steps in that order. Rather, the various steps of each of the methods disclosed herein can be performed in any of a variety of sequences. In addition, as the illustrated flowcharts and sequence diagrams are merely exemplary embodiments, various other methods that include additional steps or include fewer steps than illustrated are also within the scope of the present disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A fuel payment method, comprising:
storing payment information in a memory of a fuel dispenser;
executing a mutual authentication process for the fuel dispenser and a mobile device, and, in response to successful completion of the mutual authentication process, producing a session key;
after producing the session key, receiving a request at the fuel dispenser to initiate a transaction for a user to purchase fuel;
encrypting authorization information using the session key and transmitting the encrypted authorization information from the fuel dispenser to the mobile device;
receiving, at the fuel dispenser from the mobile device, a validation result in response to the transmitted encrypted authorization information;
in response to the received validation result being positive, executing the requested transaction using the stored payment information stored and then allowing fuel to be dispensed; and
in response to the received validation result being negative, denying the requested transaction and not allowing fuel to be dispensed using the stored payment information.

2. The method of claim 1, wherein the request is either wirelessly received from the mobile device or is received via a user interface element attached to the fuel dispenser.

3. The method of claim 1, wherein unsuccessful completion of the mutual authentication process does not result in production of the session key and results in the fuel dispenser preventing the mobile device from conducting the transaction with the fuel dispenser.

4. A payment processing terminal, comprising:
a wireless communication interface configured to detect presence of a mobile device within an effective wireless communication range of the wireless communication interface; and
a processor configured to, in response to the wireless communication interface detecting the presence of the mobile device, cause:
    initiation of a mutual authentication process to authenticate the mobile device and the terminal with each other for secure communication therebetween,
    production of a session key in response to completion of the mutual authentication process in which the mobile device and the terminal are successfully mutually authenticated with each other for secure communication therebetween, and
    after the production of the session key, receive from the mobile device a request for a transaction and receive from the mobile device payment data for the transaction, the payment data being encrypted using the session key.

5. The terminal of claim 4, wherein the wireless communication interface and the processor are integrated with a dispenser configured to dispense a good to a user.

6. The terminal of claim 5, wherein the processor is further configured to, after the receipt of the payment data, cause the dispenser to dispense the good to a user associated with the mobile device.

7. The terminal of claim 5, wherein the processor is further configured to, in response to unsuccessful mutual authentication of the mobile device and the terminal with each other, prevent the dispenser from dispensing the good to a user associated with the mobile device.

8. The terminal of claim 5, wherein the good includes one of fuel, food, drink, and cash.

9. The terminal of claim 4, wherein the wireless communication interface configured to detect presence of the mobile device includes the wireless communication interface polling for presence of the mobile device and detecting the presence.

10. The terminal of claim 4, wherein the processor is configured to, in response to the wireless communication interface detecting the presence of the mobile device within the effective wireless communication range, initiate the mutual authentication process automatically without user input to the mobile device or to the terminal.

11. The terminal of claim 4, wherein the processor is further configured to, in response to the receipt of the request for the transaction, cause transmission of customer loyalty data to the mobile device using the wireless communication interface, the customer loyalty data being encrypted using the session key.

12. A mobile device, comprising:
a wireless communication interface configured to detect presence of a payment terminal within an effective wireless communication range of the wireless communication interface; and
a processor configured to, in response to the wireless communication interface detecting the presence of the terminal, cause:
initiation of a mutual authentication process to authenticate the mobile device and the terminal with each other for secure communication therebetween,
production of a session key in response to completion of the mutual authentication process in which the mobile device and the terminal are successfully mutually authenticated with each other for secure communication therebetween, and
after the production of the session key, transmission to the terminal a request for a transaction and transmission to the terminal payment data for the transaction, the payment data being encrypted using the session key.

13. The mobile device of claim 12, wherein the wireless communication interface configured to detect presence of the terminal includes the wireless communication interface polling for presence of the terminal and detecting the presence.

14. The mobile device of claim 12, wherein the processor is configured to, in response to the wireless communication interface detecting the presence of the mobile device within the effective wireless communication range, initiate the mutual authentication process automatically without user input to the mobile device or to the terminal.

15. The mobile device of claim 12, wherein, in response to the transmission of the request for the transaction, the wireless communication interface is configured to receive customer loyalty data from the terminal, the customer loyalty data being encrypted using the session key.

16. The mobile device of claim 12, wherein the processor is further configured to, before the wireless communication interface detects the presence of the terminal, cause a prompt to be provided to a user to provide an input pre-authorizing the detecting.

17. The mobile device of claim 16, wherein the input includes at least one of user installation of an application on the mobile device, user loading of payment information onto the mobile device, and user loading of customer loyalty information onto the mobile device.

18. The mobile device of claim 12, wherein the terminal is integrated with a dispenser configured to dispense a good to a user.

19. The mobile device of claim 18, wherein the good includes one of fuel, food, drink, and cash.

20. The mobile device of claim 18, wherein the terminal is configured to, in response to receipt of the payment data, dispense the good to a user associated with the mobile device.

* * * * *